Feb. 28, 1967  J. B. CURCIO  3,306,654
DUMP BODY SIDE WALL CONSTRUCTION
Filed Sept. 24, 1964  2 Sheets-Sheet 2
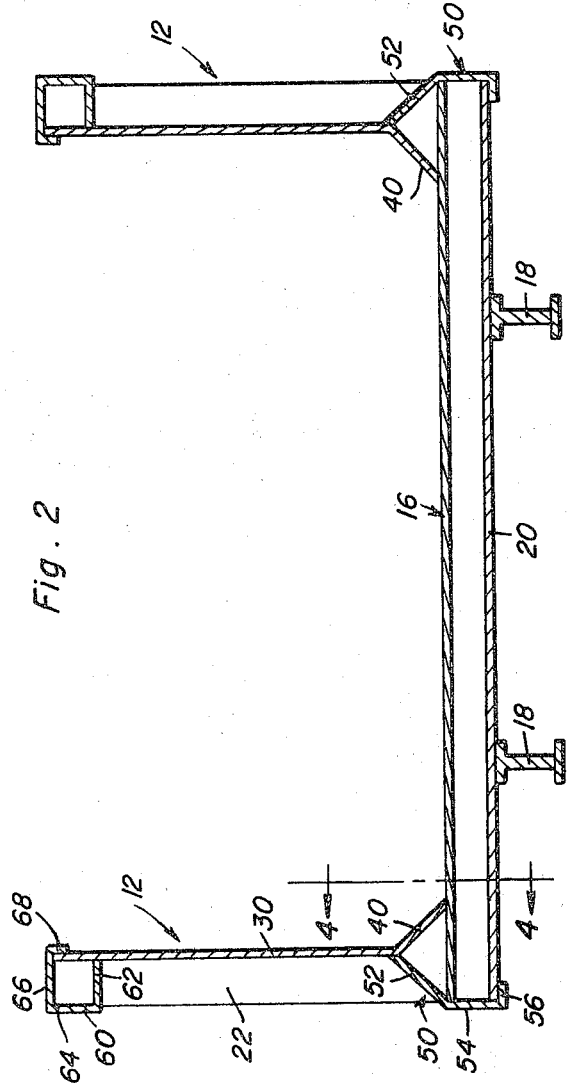
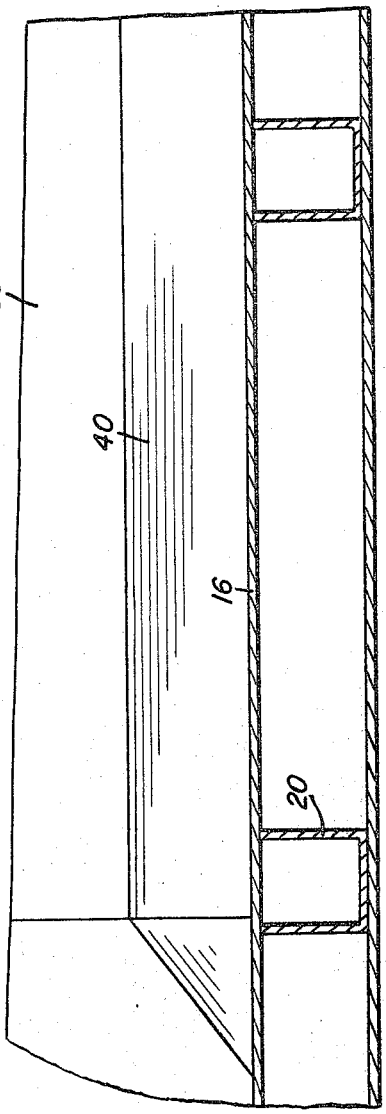
John B. Curcio
INVENTOR.

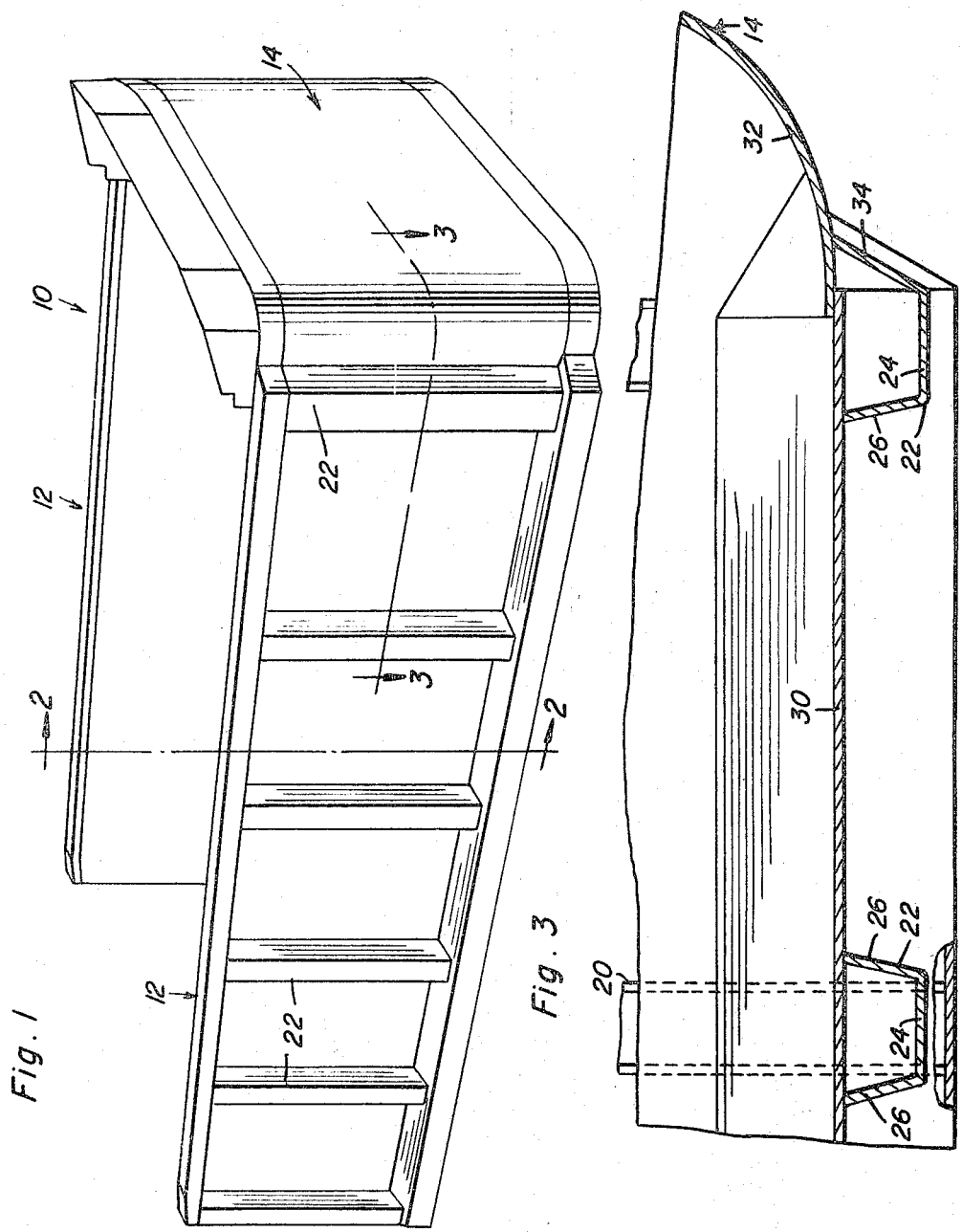

United States Patent Office

3,306,654
Patented Feb. 28, 1967

3,306,654
DUMP BODY SIDE WALL CONSTRUCTION
John B. Curcio, 855 N. Laurel St.,
Hazleton, Pa. 18201
Filed Sept. 24, 1964, Ser. No. 398,982
8 Claims. (Cl. 296—28)

This invention comprises a novel and useful dump body side wall construction and more particularly pertains to a dump truck body of the tiltable type which is movable from a horizontal load carrying position to an inclined dumping position for the purpose of dumping the contents thereof.

In conventional truck dump bodies, a problem arises from the tendency of dirt and other wet materials to cling to the gutters or corners where the side walls join the bottom of the body and which thus interferes with the dumping operation. Frequently, it is necessary to resort to additional means for either scraping the dirt from its clinging contact with the side walls and bottom of the body or to apply vibration thereto in order to loosen the dirt and thus permit a complete evacuation of the contents of the truck body.

It is therefore the primary purpose of this invention to provide a dump body construction which by virtue of its improved side wall and bottom wall connections shall largely overcome this disadvantage by eliminating the tendency of earth and other materials to cling to the side and bottom walls at their junction.

A still further object of the invention is to provide a dump body construction in accordance with the preceding object which while making use of relatively light sheet metal materials for its construction shall be extremely sturdy and dependable in its operation.

Yet another purpose of the invention is to provide a dump body construction which will enable the use of sheet material for the side walls and yet shall have an exceedingly strong construction, highly resistant to lateral deflection under the loads imposed upon it by the load carried by the truck.

More specifically, it is a further object of the invention to provide a dump body construction wherein the vertical side wall members of a truck body are joined to the horizontal bottom wall by inclined plates so as to eliminate the substantially perpendicular or right angular corner or gutter at the junction of the side walls and bottom wall which is common to conventional truck bodies in favor of an inclined surface at such junction which will tend to cause the material carried by the truck to roll away from rather than be compressed into and cling to the corner between the bottom and side walls.

A further and more specific object of the invention is to provide a dump body construction in accordance with the foregoing objects which shall enable the use of a relatively thin sheet metal panel as the main portion of the side wall together with adequate reinforcing for this panel at longitudinally spaced regions along its length by vertical support columns and the longitudinally extending horizontal girder-like members along its top and bottom edge.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

FIGURE 1 is a perspective view showing a suitable construction of a truck dump body incorporating therein the principles of this invention;

FIGURE 2 is a view in vertical transverse section taken substantially upon the plane indicated by the section line 2—2 of FIGURE 1 and showing further details of the side wall construction and of the means for joining the latter to the bottom wall of the truck body;

FIGURE 3 is a horizontal sectional detailed view taken upon an enlarged scale substantially upon the plane indicated by the section line 3—3 of FIGURE 1 and showing further details of the rounded front portion of the truck body and its junction with the side wall thereof; and, FIGURE 4 is a further detailed view taken upon an enlarged scale in vertical transverse section taken substantially upon the plane indicated by the section line 4—4 of FIGURE 2.

In the accompanying drawings, reference is made first to FIGURE 1 wherein the numeral 10 designates generally a conventional type of a dump body construction for trucks but which has been modified to incorporate therein the principles of this invention. The truck body as illustrated includes a pair of vertically and longitudinally extending side walls each indicated by the numeral 12 together with a front wall 14. There is further provided as shown in FIGURE 2 a bottom wall 16 which latter rests upon a pair of longitudinally extending frame members 18 forming a part of the support structure for the truck body and preferably comprising a part of the chassis of the truck itself. Referring further to FIGURE 4 it will be observed that the bottom wall 16 is preferably of a sheet-like material and is shown supported upon a plurality of transversely extending and longitudinally spaced U-shaped channel members 20.

In the usual dump truck body, the side walls join the bottom wall at a right angular relationship so that there is thus formed a curb, gutter or corner extending the length of the truck body. Due to the perpendicular disposition of the bottom and side walls at this junction, wet material such as earth carried by the truck tends to pack and cling into these corners where it is very difficult to dislodge when the truck body has been tilted to its dumping position. Further, the tendency of the material to cling to these locations tends to corrode or otherwise deteriorate the truck body. It is a basic purpose of this invention to largely overcome this difficulty and provide a body construction which will largely eliminate the tendency of material to pack and cling to the corner between the side walls and the bottom wall.

Preferably the side walls and bottom wall are constructed of aluminum sheeting of requisite thickness and strength. In order to brace the sheet material panels which form the side walls 12 and the front wall 14, there are provided a plurality of vertically extending longitudinally spaced channel members 22. As shown in FIGURE 3, each of these channel members is of a generally U-shaped configuration consisting of a flat web portion 24 with a pair of legs or side members each indicated at 26. The lower ends of these vertical members 22 are secured to and seated upon the top surface of the marginal portion of the bottom wall 16. The sheet material panel 30 is disposed upon the inner side of or the open side of the channel members 22 and is welded or otherwise suitably bonded thereto so that a substantially rigid side wall is provided. As shown in FIGURE 3, the curved end portion 32 of the front wall 14 is nested into or overlapped with the adjacent end of the side wall panel 30 and the adjacent side wall or leg 34 of the endmost vertical member 22 is engaged therewith. Thus, this forward vertical member 22 serves additionally to secure the panels of the front and side walls together in the manner shown in FIGURE 3.

Referring next to FIGURE 2, attention is directed to the side wall construction 12 and its manner of attachment to the bottom wall 16 and the transverse underlying bed members 20 thereof. It will be observed that the side walls consist of vertical sheets of material constituting a panel. At their lower edges, these vertical sheets are provided with a downwardly and inwardly inclined end portion constituting a flange 40. The latter comprises a plate extending the full length of the side wall and of the truck bed or bottom wall and lies in the interior of the body. The lower end is secured by welding or otherwise to the bottom wall 16 and the flange 40 is preferably disposed at about a 45° inclination to the horizontal and vertical planes of the bottom wall 16 and the side wall 12. As previously noted, the relatively thin sheet material of the panel 30 is laterally reinforced and braced by the previously mentioned vertical channel members 22. Thus, deflection of the side wall under the weight of material carried by the truck body is effectively prevented.

In order to prevent the lower portion of the side wall and the flange or plate 40 carried thereby from being deformed, torn or the like, under the load imposed thereon by the material carried by the body, a brace member is provided consisting of a reinforcing member or bracket indicated generally by the numeral 50 and which preferably is in the form of a metallic extrusion or the like. The member 50 extends the entire length of the truck body and consists of a flat flange or plate-like member 52 upwardly inclined at an angle of about 45° and whose upper end engages the lower edge of the panel 30 at the junction of the flange 40 therewith. The member 50 further includes a vertically depending wall 54 which embraces the ends of the associated transverse bottom members 20 and has an inturned flange 56 at its lower end which underlies and is secured to the transverse members 20.

The lower ends of the channel members 22 are shaped to fit upon and are welded or otherwise fixedly secured to the top surface of the flange or plate 52 to thus rigidify the entire construction of the side wall and its junction and attachment to the bottom of the truck body.

The upper ends of the panel 30 forming the side walls and of the vertical channel members 22 are secured to a box-like girder or hollow member 60 which is preferably of rectangular or square cross section. This member may likewise comprise a pair of extrusions consisting of an L-shaped member having a horizontal bottom flange 62 and a vertical flange 64. The upper edges of the vertical members 22 are secured to the bottom flange 62 by welding or in any other suitable manner. A further extrusion consisting of a horizontal flange 66 with a downturned relatively shorter flange 68 is also provided. The horizontal flange 66 overlies the flange 62 and at its upper edge joins with the flange 64. The downturned flange 68 and the edge of the horizontal flange 62 embrace therebetween the upper edge of the panel 30 and are secured thereto as by welding or the like.

Thus, the two girder-like members 60 at the upper edge and 50 at the lower edge of the sheet metal panel forming the side wall 12 in conjunction with the interconnected vertical channel members 22 serve to rigidify and securely strengthen and stiffen the entire side wall and front wall structure of the truck body.

In this arrangement, it is now evident that the usual L-shaped corner where the side walls join the bottom wall of the truck body has been eliminated and replaced by an inclined flat surface consisting of the flange or plate 40. There is thus provided an exceedingly sturdy truck body which possesses a very important advantage and is relatively light in weight due to its aluminum construction, is corrosion resistant, eliminates the usual gutter or corner at the junction of the side and bottom walls in which moisture accumulates and where the material carried by the truck tends to cling and pack. Consequently, the truck body is much more easily emptied when it is tilted into dumping position.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention as claimed.

What is claimed as new is as follows:

1. A load body construction comprising a plurality of stationarily interconnected elongated transversely spaced metal brace members, a metal bottom wall disposed over said brace members and secured thereto, said bottom wall including opposite side marginal edge portions between which said brace members extend, upstanding side wall panels extending along and having their lower edge portions secured to said opposite side marginal edge portions inwardly of the marginal edges thereof, at least the lower portions of said side wall panels being spaced inwardly of vertical planes containing said marginal edges, an elongated structural member extending along each of said marginal edge portions, said structural members each including an upstanding flange portion disposed immediately outwardly of and opposing the corresponding ends of said brace members and said marginal edges of said bottom wall terminating at its lower edge portion in an inturned lower flange underlying and secured to said corresponding ends and terminating at its upper edge portion in an inwardly and upwardly inclined upper flange whose free edge intersects with and is welded to the corresponding side wall panel above said bottom wall, said structural members closely embracing the corresponding marginal edges of said bottom wall and the ends of said brace members.

2. The combination of claim 1 wherein said side wall panels terminate downwardly in downwardly and inwardly inclined lower marginal edge portions.

3. The combination of claim 2 wherein said inwardly and upwardly inclined flanges are welded to the corresponding side wall panels closely adjacent the upper extremities of the corresponding downwardly and inwardly inclined lower marginal edge portion thereof.

4. The combination of claim 1 including a plurality of upstanding and inwardly opening metal channel-shaped vertical members welded to the outer surfaces of said side wall panels at points spaced longitudinally therealong, the lower ends of said vertical members being bevelled so as to conform to and being welded to the upwardly and outwardly inclined outer surfaces of said upper flanges.

5. The combination of claim 1 including an upper reinforcing member secured to and extending along the upper marginal edge portion of each of said side wall panels, said reinforcing members each including a hollow box-like beam, said beams including top and lower walls interconnected at corresponding outer edge portions by means of an outer wall, the inner marginal edge portion of said top wall projecting inwardly of the inner marginal edge portion of said lower wall and terminating inwardly in a downturned flange, the upper marginal edge portions of said side wall panels being hooked behind said downturned flanges and the inner marginal edge portions of said bottom wall being abutted against and welded to the opposing outer surface portions of said side wall panels, said downturned flanges also being welded to said side wall panels.

6. The combination of claim 5 including a plurality of upstanding and inwardly opening metal channel-shaped vertical members welded to the outer surfaces of said side wall panels at points spaced longitudinally therealong, the lower ends of said vertical members being bevelled so as to conform to and being welded to the upwardly and outwardly inclined outer surfaces of said upper flanges, and the upper ends of said vertical members being abutted against and welded to the opposing undersurface portions of said lower walls.

7. The combination of claim 6 wherein said side wall panels terminate downwardly in downwardly and inwardly inclined lower marginal edge portions.

8. The combination of claim 7 wherein said inwardly and upwardly inclined flanges are welded to the corresponding side wall panels closely adjacent the upper extremities of the corresponding downwardly and inwardly inclined lower marginal edge portion thereof.

References Cited by the Examiner

UNITED STATES PATENTS

| | | | |
|---|---|---|---|
| 2,945,721 | 7/1960 | Chaney | 296—28 |
| 3,094,351 | 6/1963 | Gwinn | 296—28 |

FOREIGN PATENTS 670,903  9/1963  Canada.

MILTON BUCHLER, *Primary Examiner.*

BENJAMIN HERSH, *Examiner.*

J. A. PEKAR, *Assistant Examiner.*